C. WESTERGARD.
MACHINE FOR MOLDING PIPE.
APPLICATION FILED JUNE 7, 1913.
1,143,094.
Patented June 15, 1915.
4 SHEETS—SHEET 3.
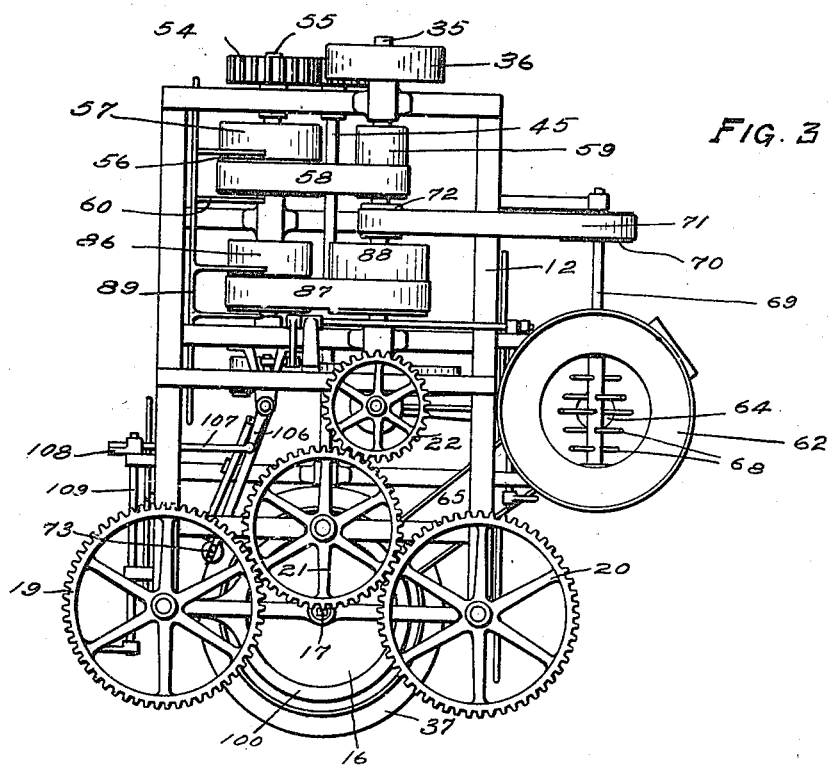
FIG. 3
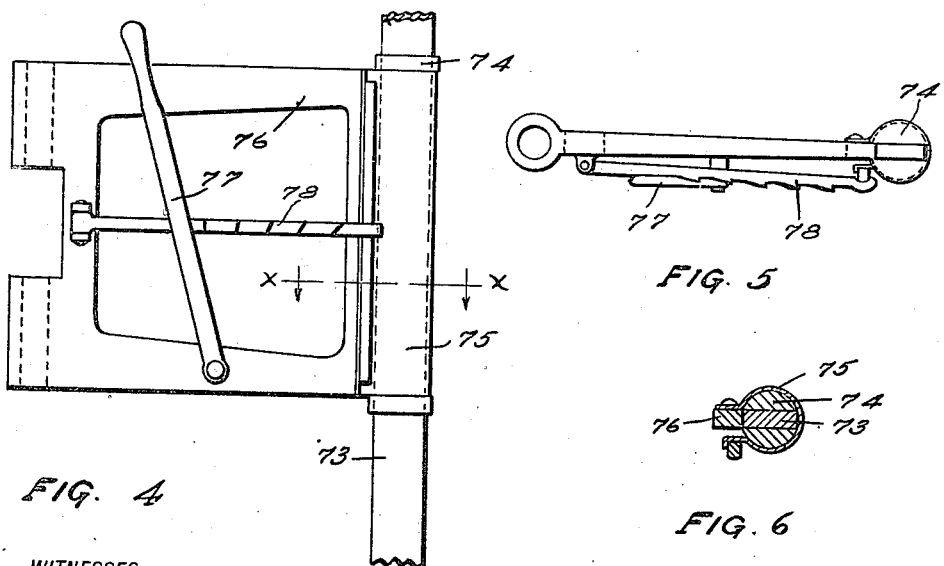
FIG. 4
FIG. 5
FIG. 6
WITNESSES:
O. Johnson
F. C. Matheny
INVENTOR
Christ Westergard
BY
C. D. Haskins
ATTORNEY

C. WESTERGARD.
MACHINE FOR MOLDING PIPE.
APPLICATION FILED JUNE 7, 1913.

1,143,094.

Patented June 15, 1915.
4 SHEETS—SHEET 4.

WITNESSES:
O. Johnson
F. C. Matheny

INVENTOR
Christ Westergard
BY
C. D. Haskins
ATTORNEY

UNITED STATES PATENT OFFICE.

CHRIST WESTERGARD, OF EVERETT, WASHINGTON, ASSIGNOR OF ONE-HALF TO GEORGE McKENZIE, OF EVERETT, WASHINGTON.

MACHINE FOR MOLDING PIPE.

1,143,094.  Specification of Letters Patent.  Patented June 15, 1915.

Application filed June 7, 1913. Serial No. 772,249.

*To all whom it may concern:*

Be it known that I, CHRIST WESTERGARD, citizen of the United States, residing at Everett, in the county of Snohomish and State of Washington, have invented a certain new and useful Improvement in Machines for Molding Pipe, of which the following is a specification.

My invention relates to improvements in machinery for molding pipe and the objects of my improvement are to provide a power actuated pipe molding machine embodying an improved form of mold, improved means for raising and lowering the core associated with said mold, an improved form of tamping bar adapted to be retardingly held within a bracket and to move upwardly through such bracket as the mold fills, an improved form of collar for molding the flange on the end of a section of pipe and means for quickly removing the finished pipe from the machine and inserting a new mold and for varying the speed of rotation of the mold when making different sizes of pipe. I attain these objects by devices illustrated in the accompanying drawings, in which—

Figure 1:
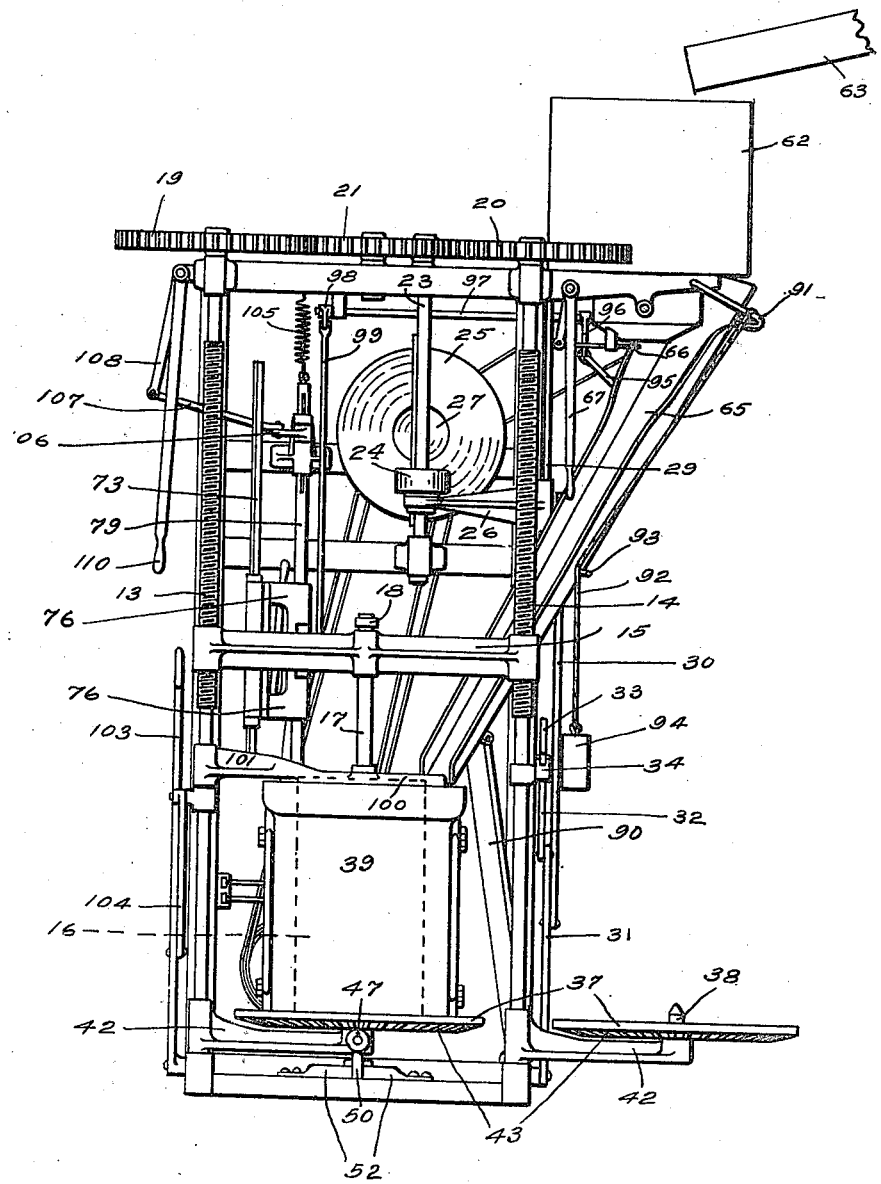
Figure 2:
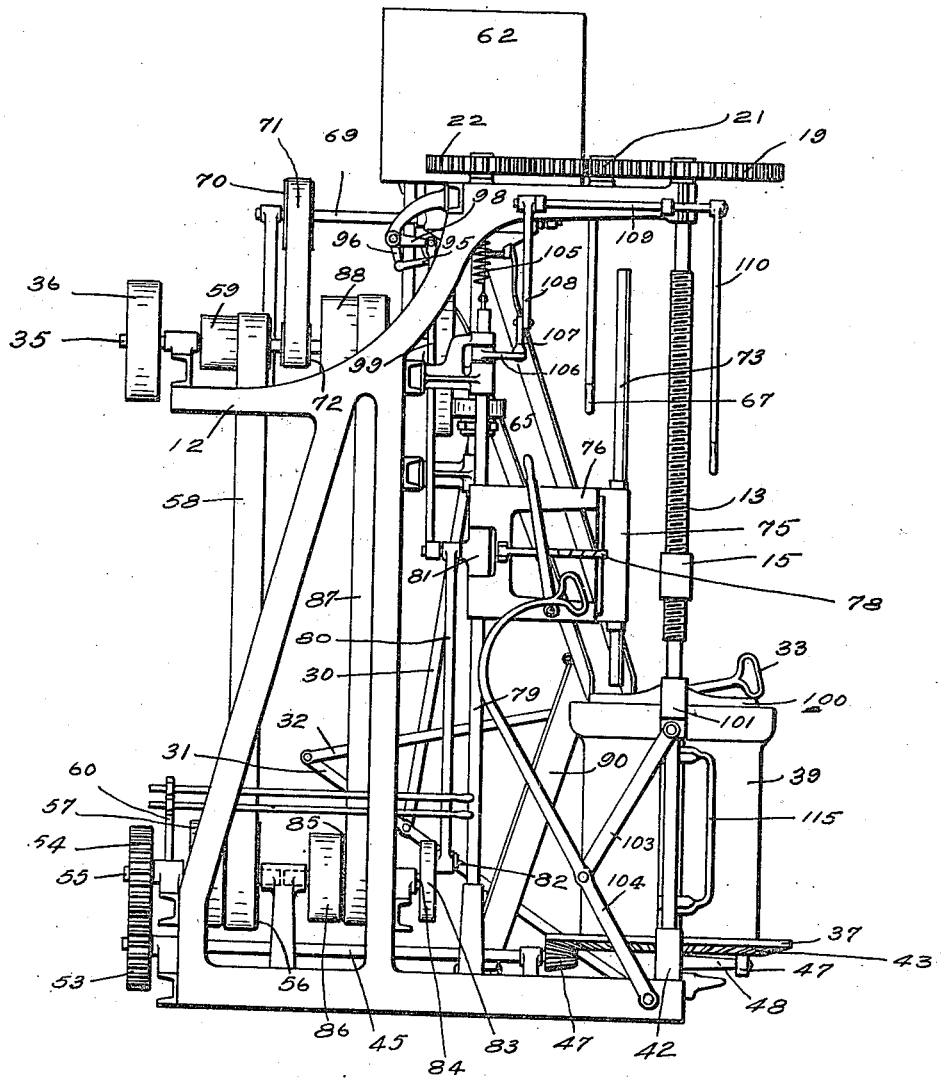
Figure 7:
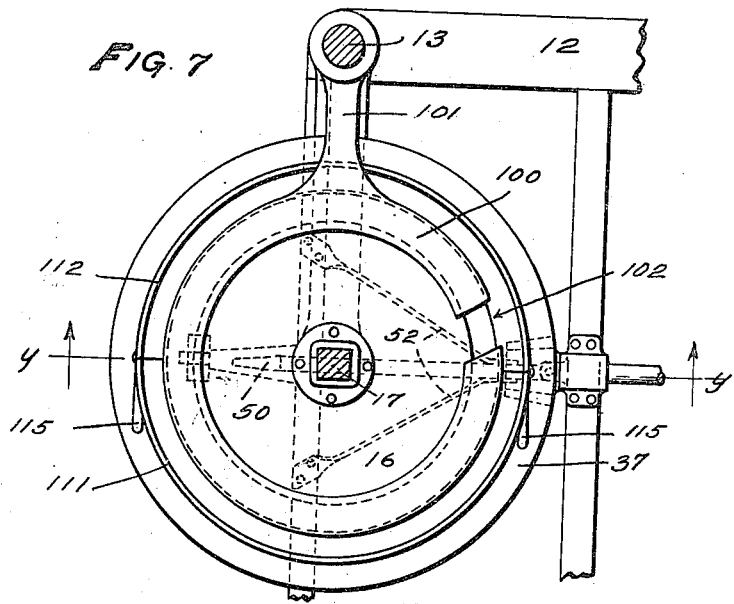
Figure 9:
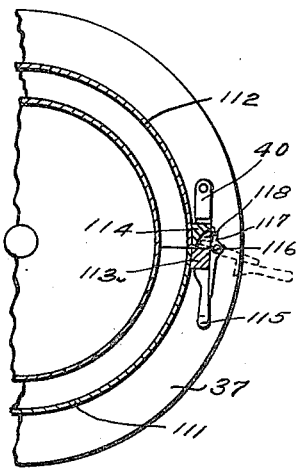
Figure 8:
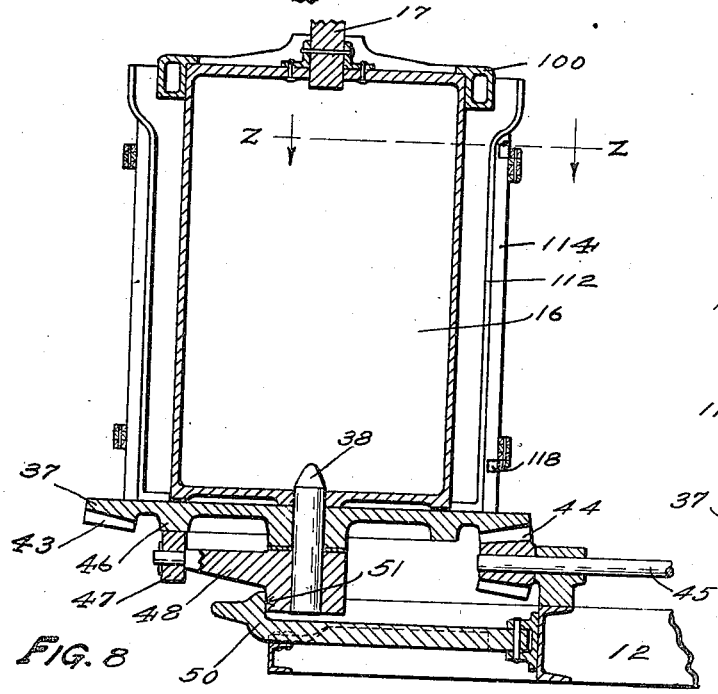
Figure 10:
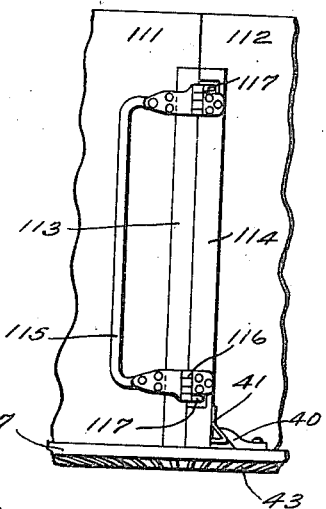

Figure 1, is a view in front elevation of a structure embodying my invention; Fig. 2, is a view in side elevation of the same; Fig. 3, is a plan view of the same; Fig. 4, is a view in side elevation of a portion of the tamping bar and associated parts; Fig. 5 is a plan view of the device illustrated in Fig. 4; Fig. 6, is a sectional view on the line $x$, $x$ of Fig. 4; Fig. 7, is a plan view of the molding device; Fig. 8, is a vertical sectional view on the line $y$, $y$ of Fig. 7; Fig. 9, is a fragmentary sectional view on the line $z$, $z$ of Fig. 8, and Fig. 10, is a fragmentary view in side elevation of the locking and opening mechanism on the side of the mold.

Like reference numerals indicate like parts throughout the drawings.

Referring to the accompanying drawings 12 is a frame, 13 and 14 are two vertical threaded shafts spaced apart and having their top and bottom ends suitably journaled in said frame, 15 is a horizontal cross bar connecting the shafts 13 and 14 and having its two ends threaded to fit the threads on said shafts and adapted to be moved up and down by rotating said shafts.

16 is a cylindrical pipe core having a concentrically disposed squared shaft 17 projecting from its top side, said shaft 17 being adapted to slidably pass through a squared hole provided in the cross-bar 15 midway of its length and to have a collar 18 secured to its top end in such a manner that the collar 18 will engage the bar 15 to lift the core 16 when the bar 15 be raised.

19 and 20 are spur gears fixedly secured to the top ends of the shafts 13 and 14, respectively, and adapted to be actuated by an idler gear 21, suitably journaled in the frame 12. The idler gear 21 may be driven by a spur gear 22, which is fixedly secured to a vertical shaft 23, suitably journaled in the frame 12, and carrying a slidably mounted paper friction roller 24 on its lower end. The friction roller 24 is operatively disposed to engage the face of a friction disk 25, and is provided with a shifting bracket 26, by means of which it may be moved vertically across the face of the disk 25 to secure variations in speed or to reverse its direction of rotation, said friction disk 25 being provided with a concentrically disposed recess 27 into which the roller 24 may be shifted when it is desired to stop the mechanism connected therewith.

The bracket 26 is slidably mounted on a shaft 29, fixedly secured to the frame 12 and is adapted to be moved up or down on said shaft 29 by a link 30, which link 30 is adapted to be pivotally secured a short distance from the upper end of an inclined link 31, said link 31 having its lower end pivotally secured to the lower portion of the frame and its upper end pivotally connected with a bar 32, which bar 32 is provided with a hand hold 33 on its forward end and adapted to be moved backwardly and forwardly through a guide 34, as shown in Fig. 1, provided on the frame 12. When the bar 32 is thrust backwardly it lowers the upper end of the link 30 to act to move the friction roller 24 downwardly across the face of the friction disk 25, and when said bar 32 is moved forwardly it raises the links connected therewith and causes them to act to move the friction roller 24 upwardly across the friction disk 25.

The friction disk 25 is mounted on a drive shaft 35, rotatably journaled in bearings attached to the frame 12, and provided with a pulley 36 on its outer end to which power may be applied, as by a belt, to rotate said shaft.

The cylindrical core 16 is adapted to rest upon one of two rotatably mounted platforms or disks 37, 37, and is provided with a concentrically disposed hole in its lower end adapted to fit over and to be centered by a concentrically disposed lug 38 provided on the top surface of each of the rotatably mounted disks 37, 37. A two part outer wall 39 is adapted to be concentrically disposed about the core 16, in such a manner that space is left between it and the wall of said core, in which space, material, as concrete mixture, clay, wood pulp and the like may be introduced to form a pipe. The mold 39 is centered and held in its proper position on the disk 37 by hooks 40, provided on the disks 37, 37 and adapted to engage with lugs 41, provided on the mold 39, as illustrated in Fig. 10.

The disks 37, 37 are rotatably mounted on brackets 42, 42 which brackets 42, 42 are swingingly mounted on the lower ends of the two shafts 13 and 14, as illustrated in Fig. 1, in such a manner that one disk 37, may be swung outwardly for the purpose of removing a finished joint of pipe while the other disk 37, may be swung inwardly in its operative position to support a mold that is being filled. Each of said disks 37, 37 is provided with an integral bevel gear 43 concentrically disposed on its under surface near its periphery, which bevel gear 43 is adapted to mesh with, and be driven by, a pinion 44, mounted on a shaft 45, suitably journaled in the frame 12; and each of said disks 37, 37 is further provided with a concentrically disposed downwardly projecting circular ridge or track 46, adapted to bear on the roller 47 rotatably mounted on an arm 48 provided on the bracket 42 and oppositely disposed from the spur gear 44 for the purpose of relieving strain and wear on the pin 49 about which the disk 37 rotates. An arm 50, illustrated in Fig. 8, is provided at its outer end with a hook 51 adapted to engage with the brackets 42, 42, and is held in a central position by two balanced springs 52, 52, illustrated by broken lines in Fig. 7, which permit it to be swung to either side, said arm 50 having its inner end pivotally connected with the frame 12. The shaft 45 is provided with a spur gear 53 which spur gear 53 is adapted to mesh with and be driven by another spur gear 54 mounted on a shaft 55, suitably journaled in bearings on the frame 12 and belt pulley 56, and an idler pulley 57. A belt 58, is provided to connect the pulleys 56 and 57 with a pulley 59, provided on the drive shaft 35 and a belt shifter 60, adapted to be moved horizontally by a handle 61 that is so disposed that the belt 58 may be shifted to the pulley 56 when it is desired to actuate the mechanism connected therewith, or to the idler 57 when it is desired to stop said mechanism. A hopper 62, into which suitable material, as concrete mixture may be delivered, as by a conveyer 63, is mounted on the frame 12 and is provided with an opening 64, in its bottom side through which said material may be fed into a spout 65 there to be conveyed to the mold.

The size of the opening 64 may be regulated or may be entirely closed by a slidable paddle 66, suitably associated with the bottom side of the hopper 62 and adapted to be moved horizontally across the opening 64 by a lever 67, as clearly illustrated in Fig. 1; and an agitator 68, disposed within the hopper 62 just above the opening 64 and mounted on a shaft 69, having a pulley 70, on its backwardly projecting end, and suitably journaled in bearings provided in the frame 12 is adapted to be rotated by a belt 71, connecting the pulley 70 with a pulley 72, fixedly secured on the drive shaft 35, the agitator 68 serving evenly to feed the material downwardly into the spout 65. A tamping bar 73, adapted to have its lower end reciprocate between the wall of the rotating mold to tamp the material therebetween, is slidably mounted between two friction strips 74, 74, which are provided within a clamping spring 75, extending longitudinally along the front edge of a bracket 76, as illustrated in Figs. 4, 5 and 6, said spring 75 being adapted to have its tension about the friction strips 74 varied by moving a lever 77, backwardly or forwardly over an inclined toothed bar 78 being pivotally secured to the backward portion of the bracket 76 and adapted to rest its front end on the free edge of the spring in such a manner that when the lever 77 be moved forwardly over said toothed bar 78 pressure will be exerted on the free edge of the spring 75 and a greater friction will be exerted on the tamping bar 73, and when the lever 77 be moved backwardly over the toothed bar 78 pressure on the edge of the spring 75 will be released thus releasing the friction on the tamping bar 73. In this way the tamping bar 73 may be adjusted to resistingly move upward as the mold fills. The solidity to which the mixture may be tamped varies directly with the friction under which the tamping bar operates.

The back edge of the bracket 76 is fixedly secured to a vertical shaft 79, which shaft 79 is slidably mounted in bearings provided on the frame 12 and is adapted to have a reciprocatory motion imparted to it by a connecting rod 80, pivotally secured to the shaft 79 by a sleeve 81, and having its lower end pivotally mounted on a crank-pin 82, on a crank disk 83, the crank disk 83 being mounted on a shaft 84, journaled in suitable bearings provided on the frame 12 and having associated therewith a fixedly secured pulley 85, an idler pulley 86. A belt 87, is provided to connect the pulleys 85 and 86 with a pulley 88, provided on the drive shaft 35 and a belt shifter 89 suitably adapted to be moved horizontally is so disposed that the belt 87 may be shifted to the pulley 85 when it is desired to actuate the tamping bar 73, or the idler 86 when it is desired to stop the motion of said tamping bar.

The spout 65 has its lower end pivotally secured to the frame 12 by a support 90, and its upper end slidably mounted within a bracket 91, and is adapted to be held from sliding downwardly by a cable 92, which is secured to the bracket 91, passes downwardly along the side of the conveyer 65, over a pin 93, about which it may be wrapped if necessary, and terminates in a weight 94 at the lower end. Said spout 65 is also adapted to have a horizontally reciprocating motion imparted to it by a link 95, pivotally secured to one end of a crank arm 96, which crank arm 96 has its other end fixedly secured to one end of a transverse shaft 97, which is suitably journaled in bearings on the frame 12 and is provided with another fixedly secured crank arm 98, at its other end which crank arm 98, has its free end pivotally connected with a connecting link 99, secured to and adapted to reciprocate with the vertical shaft 79. A collar 100, is swingingly mounted on the shaft 13 by means of a bracket arm 101, and is adapted to be swung upwardly and lowered into the top of the mold to rest on the top of the core 16, as illustrated in Fig. 8, and to have concrete mixture tamped about it to form the flange on the end of a section of pipe. An opening 102, is provided in one side of the collar 100 through which the squared shaft 17 is adapted to pass when the collar is swung inwardly or outwardly and a link 103, pivotally secured to a lever arm 104, as clearly shown in Fig. 2, is associated with the bracket 101 for the purpose of raising or lowering the collar 100.

The vertical shaft 79 is provided with a tension spring 105 at its top to assist in sustaining the weight of said shaft and its associated parts and further provided with a crank arm 106, that is pivotally secured by a link 107. To another crank arm 108 is fixedly secured one end of a shaft 109, suitably journaled in bearings on the frame 12 and is provided with a lever 110 at its other end by means of which it may be turned to turn the shaft 79 and to swing the tamping bar 73 outwardly or inwardly as desired.

The outside wall of the mold 39, Figs. 7, 8, 9 and 10 is composed of two segments 111 and 112, the segment 111 being provided with strips 113, 113 on either of its edges and the segment 112 being provided with strips 114, 114 on either of its edges. Handles 115, 115 are secured to each of the strips 114, 114 by means of hinges 116, each of said handles 115, 115 being provided with a suitable offset adapted to engage with the strip 113 to hold the two segments together as illustrated in Fig. 9, and each of said hinges 116 being provided with a pawl 117 disposed to project in the opposite direction from the handle 115 in such a manner that when said handle is swung outwardly, as shown by broken lines in Fig. 9, the pawl 117 will be caused to swing upwardly through a notch 118, provided in the strip 114 and to press against the strip 113 to pry apart the two segments of the mold 39.

The operation of my invention may be described as follows: The outside wall of the mold that is to be used is placed on one of the disks 37, 37 and the mold core 16 is raised by shifting the friction roller 24 and rotating the threaded shafts 13 and 14 to raise the cross bar 15. The disk 37 on which the outside wall of the mold has been placed is then swung inwardly until the gear teeth 43 are in mesh with the gear teeth on the pinion 44 and the hook 51 has engaged the bracket 42 to hold said disk in its proper position. The core 16 is then lowered and the pinion 44 is made to rotate to drive the disk 37, by shifting the belt 58, from the idler pulley 57 to the pulley 56. The spout 65 is arranged to deliver material into the mold 39, the tamping bar 18 is positioned within said mold 39 and made to reciprocate by suitably adjusting the belt 87, and the mold is allowed to fill. When the mold has filled almost to the top, the tamping bar is removed, the collar 100 is swung into position on the top of the core 16, as illustrated in Fig. 8, the tamping bar is replaced and more material is introduced and tamped about the collar 100 to form the flange of the pipe. When a section of pipe is finished the supply of concrete mixture may be shut off, the tamping bar 78 and collar 100 swing outwardly out of the way, the core 16 raised until its bottom is above the top of the mold 39, and the disk 37 supporting the mold and section of finished pipe, swung outwardly to allow another mold which may have been placed on the other disk 37, to be swung into place in the machine so that said other mold may be filled while the finished joint of pipe is being removed from the disk 37 and taken care of.

In order to provide means for varying the speed of rotation of the mold when it is desired to vary the size of the pipe, I have provided several interchangeable pairs of gears, adapted to be placed on the shafts 45 and 55, each pair of gears being adapted to give the proper peripheral speed for a certain standard size of pipe when placed on the shafts 45 and 55 and each set of gears being further adapted when interchanged on said shafts to give the proper peripheral speed for another standard size of pipe.

Obviously a separate mold and a separate core will be required for each different size of pipe and any desired material may be used in constructing said pipe.

Manifestly minor changes in details and construction of the several parts of my machine may be made within the scope of the appended claims without departing from the spirit of my invention or sacrificing any of its advantages.

What I claim is:

1. In a pipe-molding machine, the combination with a frame, of a plurality of horizontally swinging brackets each adapted to be swung to a position within said frame, and to a lateral position with relation to the frame, revoluble disks centrally mounted upon said brackets and each provided on its under side with gear teeth, a driving pinion adapted to mesh with said gear teeth, and means for locking said brackets in either of their positions.

2. In a pipe-molding machine, the combination with a frame, of a plurality of horizontally swinging brackets each adapted to be swung to a position within said frame, and to a lateral position with relation to the frame, revoluble disks centrally mounted upon said brackets and each provided on its under side with gear teeth, a driving pinion adapted to mesh with said gear teeth, and means for locking said brackets in either of their positions, comprising a spring-controlled arm pivoted to the frame at one end and provided with a hook at its opposite end.

3. In a pipe-molding machine, the combination with a frame, of a plurality of horizontally-swinging brackets each adapted to be swung to a position within said frame, and to a lateral position with relation to the frame, revoluble disks centrally mounted upon said brackets, means for locking said brackets in either of their positions, a mold concentrically disposed on each of said disks, means for filling said molds, and means for revolving each of said disks when it is in position to present its mold to said filling means.

In witness whereof, I hereunto subscribe my name this 17th day of May A. D., 1913.

CHRIST WESTERGARD.

Witnesses:
 FRANK WARREN,
 F. C. MATHENY.

Copies of this patent may be obtained for five cents each, by addressing the "Commissioner of Patents, Washington, D. C."